United States Patent Office 2,821,533
Patented Jan. 28, 1958

2,821,533

BENZANTHRONYL COMPOUNDS

Sien Moo Tsang, Middlesex Boro, N. J., assignor to American Cyanamid Company, New York, N. Y., a corporation of Maine No Drawing. Original application August 11, 1954, Serial No. 449,267. Divided and this application November 1, 1955, Serial No. 544,370

7 Claims. (Cl. 260—364)

This invention relates to a process of preparing substantially pure 6-Bz-1-diaminobenzanthrone and to intermediates therefor and to azo dyes obtainable from diaminobenzanthrone.

Deep shades are difficult to obtain in azo dyes. Often it is necessary to make complicated trisazo and tetrakisazo dyes in order to obtain some deep shades. It is very desirable in azo dyestuffs to obtain a diazo intermediate which will give a wide range of shades, and, especially, one which will give a wide range of deep shades, in the form of monoazo or, at the most, disazo dyes, since the extra coupling steps, as well as the extra materials may often be quite costly.

I have found a process for preparing Bz-1,6-diaminobenzanthrone in a purity never before obtained. This process passes through intermediates heretofore unknown. I have further found that both the intermediates in this process and 6-Bz-1-diaminobenzanthrone produce azo dyes of unexpected shades and especially unexpectedly deep shades.

In the practice of my invention a Bz-1-halogeno-6-nitrobenzanthrone is reacted in an inert solvent in the presence of a catalyst and an acid binding agent above 150° C. with an arylsulfonamide to form a Bz-1-arylsulfonamido-6-nitrobenzanthrone. This is then reduced to the corresponding Bz-1-arylsulfonamido-6-aminobenzanthrone which in turn is hydrolyzed to give a very pure 6-Bz-1-diaminobenzanthrone. The preparation can be illustrated by the following equation:

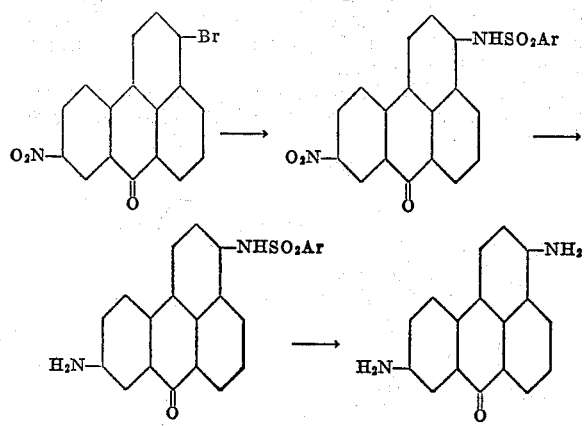

The starting material for the process of my invention, Bz-1-bromo-6-nitrobenzanthrone, is obtained from benzanthrone by monobromination, followed by mononitration, by known methods.

The halogen is replaced by a sulfonamido group by reaction with an arylsulfonamide such as benzenesulfonamide, o-toluene-sulfonamide, p-toluenesulfonamide, the xylenesulfonamides, the naphthalenesulfonamides, diphenyl-4-sulfonamide, anisolesulfonamide, nitrobenzenesulfonamide, and the like. The nature of the aryl group in the sulfonamide used is not critical except that it should be cheap and readily available and be free of interfering groups such as halogen and amino.

This reaction is carried out in a high boiling inert solvent, of which nitrobenzene is the preferred example, and in the presence of a catalyst such as finely divided copper or copper salts, and also in the presence of an acid binding agent such as an alkali metal or ammonium acetate or an alkali metal or ammonium carbonate. The sulfonamidation will take place at temperatures ranging from 150–215° C. although a preferred range is 160–180° C. The product, a Bz-1-arylsulfonamido-6-nitrobenzanthrone, is isolated by filtration from the cooled reaction mixture.

Bz-1-arylsulfonamido-6-nitrobenzanthrones form alkali salts soluble in water. This is an added advantage in our process, since it permits a further purification by dissolving in alkaline solution, clarifying and reprecipitating with acid, if such is desired. It is also an advantage of this process of my invention that the Bz-1-arylsulfonamido-6-nitrobenzanthrone can be reduced under mild conditions such as in aqueous alkaline solution. The reduction can be carried out by warming with an alkali metal ammonium sulfide such as sodium sulfide or hydrosulfide, potassium sulfide, ammonium sulfide and the like. Alternatively it can be carried out by warming with dilute caustic and sodium hydrosulte. This latter is epsecially advantageous because it can be combined with an alkali purification of the nitrosulfonamidobenzanthrone, if desired. It is usually necessary to heat the reaction mixture above 35° C. to obtain reduction and slightly higher temperatures are preferred. Too high a temperature, however, may cause saponification.

Reduction can also be carried out catalytically with hydrogen and a hydrogenation catalyst or under acid conditions by using metals and aqueous acids. The resulting Bz-1-arylsulfonamido-6-aminobenzanthrones can be used to obtain azo dyes of very interesting shades which are usable in themselves. The remaining hydrogen on the sulfonamido group may be also replaced by alkyl, acyl, and other groups to produce additional new azo dyes.

In the process of my invention, the saponification of the Bz-1-arylsulfonamido - 6 - aminobenzanthrone takes place readily at ordinary temperatures on contact with strong acids such as concentrated sulfuric acid. The product is isolated by dilution with water to form a very high quality 6-Bz-1-diaminobenzanthrone.

6-Bz-1-diaminobenzanthrone has been reported to have been prepared by methods such as dinitration and reduction. This method gives a product of very low purity since this reaction sequence produces isomeric materials from which the desired isomer has never been separated completely pure. Prior literature gives melting points of 225–230° C. The product of our invention when observed under a microscope is found to melt at a much higher temperature. At 240–245° C. the material is observed to grow into long needles which do not melt until a temperature of 259–263° C. is reached. This large increase in the melting point is indicative of a very large improvement in the state of purity. It has not heretofore been recognized by the art that it is possible to make a diaminobenzanthrone of this purity. This degree of purity is possible principally because the process of my invention proceeds by a route which does not give isomer, such as gave trouble in prior art routes.

Either 6-Bz-1-diaminobenzanthrone or Bz-1-arylsulfonamido-6-aminobenzanthrone can be diazotized and coupled with azo coupling components to give colors ranging over most of the spectrum. Coupling components which may be used are acetoacetanilide, para-cresol, 3-methyl-5-pyrazolone, benzoylacetonitrile, salicylic acid, 2-naphthol, 3-hydroxy-2-naphthoic acid and its arylides, 1-amino-5-naphthol, 1-amino-8-naphthol-2, 4-disulfonic acid, 1-amino-2-naphthol-3,6-disulfonic acid, 2-amino-5-naphthol-7-sulfonic acid, 2-phenylamino-8-naphthol-6-sulfonic acid, 4-nitro-1-naphthol, 4-methyl-1-naphthol, 2-naphthylamine, 1-naphthylamine-4-sulfonic acid, 6-chloro-2-naphthol, and 2-(3'-carboxy-4'-hydroxyphenylazo)-8-naphthol-6-sulfonic acid, 1,8-dihydroxynaphthalene-3,6-disulfonic acid, 1-phenyl-3-methyl-5-pyrazolone-4'-sulfonic acid and 2,4-dihydroxyquinoline.

When the diaminobenzanthrone is used, it is tetrazotized and coupled to form a disazo dye having similar coupling components on either side of the azo group. Dissimilar coupling components can be introduced by diazotizing the Bz-1-arylsulfonamido-6-aminobenzanthrone and coupling it to one coupling component. Hydrolysis of the arylsulfonamido group with acid, followed by diazotization of the newly formed free amino group, permit coupling into a second and different coupling component. The monoazo dyes formed from the arylsulfonamido-aminobenzanthrone are themselves interesting and valuable dyestuffs. Where such coupling components contain metallizable groups such as an ortho-hydroxycarboxylic acid residue, the dyes so obtained may be metallized either in substance or on the fiber. It is also possible to prepare polyazo dyes by successive couplings, in which at least one of the azo groups is flanked by hydroxy, carboxy, or methoxy groups situated in both ortho positions, which dyes may be converted to metallic complexes. Such dyes are distinguished by their excellent light-fastness.

It is an advantage of the dyes from diaminobenzanthrone that one obtains disazo dyes having deep shades which are difficult to obtain. These deep shades are most unexpected because structurally 6-Bz-1-diaminobenzanthrone is a 2,3,2'-substituted benzidine as can be seen by the following formula in which the darker lines outline the benzidine structure.

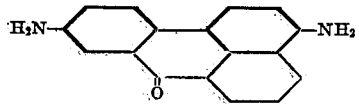

A benzidine substituted in this manner is expected to give disazo dyes which are not as deep in shade as the corresponding benzidine dyes, rather than deeper as has been found to be the case. An example of this can be shown by comparison of the coupling of 6-Bz-1-diaminobenzanthrone to cresotinic acid with the corresponding dye from benzidine and cresotinic acid (C. I. 411).

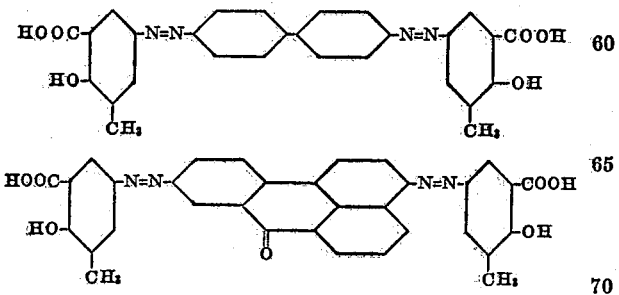

It is most unexpected to find that the dye from the diaminobenzanthrone is a brown with a shade similar to Color Index 601 and not at all close to the yellow of the corresponding benzidine dye. The brown of Color Index 601 is a trisazo dye and not a disazo dye. This is illustrative of the advantages that deep shades are obtainable with disazo dyes, shades which heretofore have required much more complicated trisazo dyes. It is a further advantage of the dyes that the shades are superior in light-fastness to the analogous benzidine dyestuffs. This is a property in which the benzidine dyestuffs have been notoriously lacking and it is most unexpected to find the corresponding diaminobenzanthrone dyestuffs to be good in this respect.

The comparison of dyes from diaminobenzanthrone with benzidine dyes is also striking when the coupling component is an aminonaphthol sulfonic acid. The couplings of benzidine and its derivatives with such compounds gives blues. For example, tetrazotized benzidine when coupled to 1-amino-8-naphthol-3,6-disulfonic acid gives an important direct blue dye for cotton, Direct Blue 2B (C. I. 406), of the structure

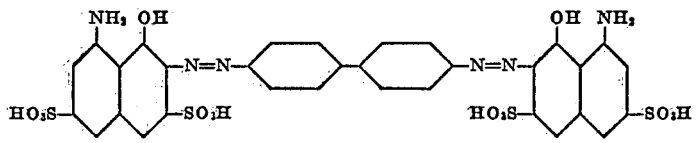

It is therefore very surprising that diaminobenzanthrone, a 2,3,2'-substituted benzidine, when coupled to 1-amino-8-naphthol-3,6-disulfonic acid gives a very much greener shade, far removed from the shade of Direct Blue 2B. Their deep shades make the dyes from diamino-benzanthrone coupled to aminonaphthol sulfonic acids a preferred embodiment of my invention.

Among the aminonaphthol sulfonic acids which may be used in the dyes of my invention, special mention should be made of 1-amino-8-naphthol-3,6-disulfonic acid, 2-amino-8-naphthol-6-sulfonic acid, and 8-amino-1-naphthol-5,7-disulfonic acid.

Sulfonated azo dyes such as these are usually used in the form of soluble salts, the sodium salt preferred. The choice of such salts is not critical and the dyestuffs of my invention are shown in the form of the free acid.

The pure diaminobenzanthrone of my invention is also suitable as a starting material for the preparation of vat dyes, as is also the intermediate arylsulfonamido amino benzanthrone. Since these compounds are purer than the previously known diaminobenzanthrone, the vat dyes obtained by such reactions as condensation with halogenoanthraquinones and the like are also purer and the resulting shades are brighter.

My invention can be illustrated by the following examples in which parts are by weight unless otherwise specified.

*Example 1*

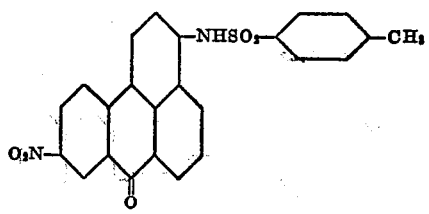

A mixture of 17.7 parts of Bz-1-bromo-6-nitrobenzanthrone (prepared according to Day, J. Chem. Soc. 1940, 1474), 12.0 parts of toluenesulfonamide, 6.9 parts of anhydrous potassium acetate, 2 parts of copper butylphthalate and 300 parts of nitrobenzene is heated at 160° C. until the reaction is substantially complete, cooled to 60° C. and filtered. The crude Bz-1-tolylamino-6-nitrobenzanthrone thus obtained is dissolved in sodium hydroxide solution, clarified by filtration and reprecipitated with dilute acetic acid. The pure product, when dry, melts about 288° C. with decomposition.

Example 2

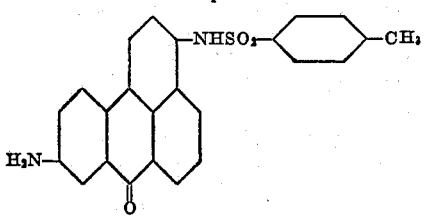

A solution of 8.89 parts of dry Bz-1-tolylsulfonamido-6-nitrobenzanthrone, obtained according to Example 1, in a mixture consisting of 71 parts of 17% sodium hydroxide solution, 350 parts of water and 17.1 parts of sodium hydrosulfite is warmed at 50–55° C. until the reduction is complete. The product is precipitated as the sodium salt by the addition of sodium chloride, and isolated by filtration. The salt is converted to the free acid form by dissolving in 350 parts of water and precipitating with acetic acid, filtering and drying.

Alternatively, the reduction can be carried out by modifying the above procedure in the following manner. The Bz-1-tolylsulfonamido-6-nitrobenzanthrone is warmed with the water and the sodium hydroxide. The solution thus formed is clarified by filtration and the sodium hydrosulfite is added. The product is isolated and acidified as before.

Example 3

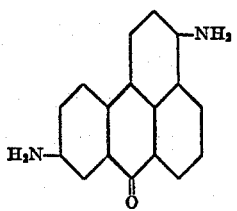

Saponification of the tolylsulfonamido group is accomplished by mixing 4.14 parts of Bz-1-tolylsulfonamido-6-aminobenzanthrone, prepared as in Example 2 with 74 parts of 97% sulfuric acid and allowing the mixture to remain at room temperature until saponification is complete. The product is isolated by drowning in 300 parts of water, filtering, slurrying in sodium hydroxide solution which gives the free diamine, filtering, washing with water, and drying. The 6-Bz-1-diaminobenzanthrone thus produced is of excellent quality. On the hot stage of a polarizing microscope, this product is observed to grow into needles over the range 240–245° C. and to melt at 259–263° C.

Example 4

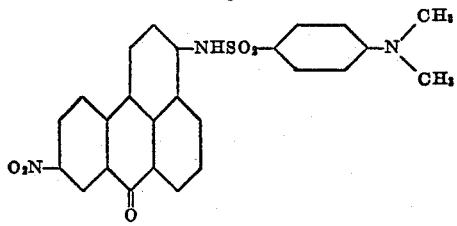

If, in Example 1 the 12.0 parts of p-toluenesulfonamide is replaced with 14.7 parts of 4-dimethylaminobenzenesulfonamide, the product obtained is Bz-1-(4'-dimethylaminobenzenesulfonamido)-6-nitrobenzanthrone.

Example 5

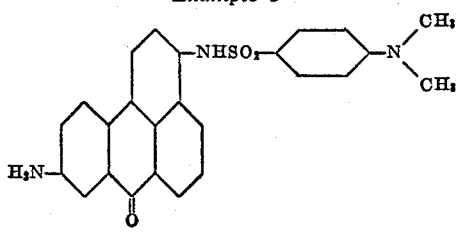

If, in Example 2, the 8.89 parts of dry Bz-1-tolylsulfonamido-6-nitrobenzanthrone is replaced by 9.08 parts of Bz - 1 - (4'dimethylaminobenzenesulfonamido) - 6 - nitrobenzanthrone, the product obtained is Bz-1-(4'-dimethylaminobenzenesulfonamido)-6-aminobenzanthrone.

Example 6

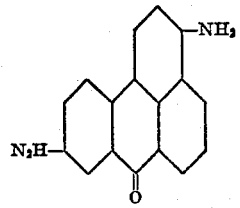

Saponification of 4.24 parts of the product obtained in Example 5 using the procedure of Example 3, results in 6-Bz-1-diaminobenzanthrone of good quality.

Example 7

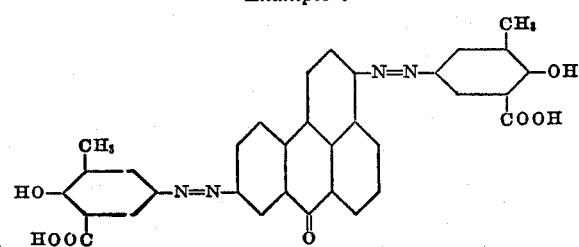

The disazo dye of 6-Bz-1-diaminobenzanthrone coupled to cresotinic acid is prepared as follows:

To a partial solution of 2.60 parts of 6-Bz-1-diaminobenzanthrone in 52.5 parts cold glacial acetic acid is added a solution of 1.44 parts sodium nitrite in 18.4 parts of 97% sulfuric acid. The resultant solution is diluted with 71 parts ether and the precipitated tetrazo washed with ether.

The entire amount of tetrazo product is dissolved in 60 parts water and the resultant solution added to a cold solution made by dissolving 3.8 parts of 2-hydroxy-3-methyl-benzoic acid in a solution in turn made by adding 10.0 parts sodium carbonate to 120 parts by volume of water and cooling. The resultant slurry of disazo dye is stirred until all of the tetrazo has been coupled. It is then heated for several hours at moderate temperatures, isolated by filtration and dried.

The disazo dye when dyed on animal and vegetable fibers gives a brown shade similar to the brown of Color Index 601 and behaves similarly on after-treatment with bichromate-copper sulfateacetic acid, turning to a redder brown. However, our disazo dye is greatly superior in fastness to light to the dye of Color Index 601.

Example 8

Other disazo dyes from 6-Bz-1-diaminobenzanthrone, prepared using the method of Example 7 are listed below according to the coupling component used.

| Coupling Component used | Shade of Disazo Dye obtained on cotton |
|---|---|
| 1-amino-8-naphthol-3,6-disulfonic acid. | A blue much greener than C. I. 406. |
| 2-amino-8-naphthol-6-sulfonic acid. | A navy somewhat redder than C. I. 401. When diazotized and developed with m-toluylene diamine it behaved similarly. |
| 8-amino-1-naphthol-5,7-disulfonic acid. | A greenish blue. |

The monoazo dye obtained by coupling diazotized Bz-1-tolylsulfonamido-6-aminobenzanthrone to 1-amino-8-naphthol-3,6-disulfonic acid is a violet on cotton. On animal fibers, it is a violet brown.

Example 9

The 6-Bz-1-diaminobenzanthrone was used as a fast base with coupling components of the Naphthol AS type for the production of deep shades on cotton. The following list shows the results obtained when tetrazotized 6-Bz-1-diaminobenzanthrone is brought into contact with cotton cloth padded with the following compounds:

| Compound | Result |
|---|---|
| 1-(2',3'-hydroxynaphthoylamido)-naphthalene | A blue. |
| 1-(2',3'-hydroxynaphthoylamido)-2,5-dimethoxybenzene | A blue. |
| 1-(2',3'-hydroxydibenzofuranyl)-3-nitrobenzene | A blue greener than above. |
| 3,3'-dimethyl-4,4'-diacetoacetylamido-biphenyl | A dark copper-brown. |
| 1-(2',3'-hydroxyanthrylcarbonylamido)-benzene | A greyish blue green. |
| 1-(3',2'-hydroxycarbazolylcarbonylamido)-4-chlorobenzene | A dark violet brown. |
| 1-(2',3'-hydroxydibenzofuranylcarbonylamido)-2,5-dimethoxybenzene | A dark violet brown. |
| 2,[2'-hydroxy-3'-(11'-benzo[a]carbazolyl)carbonylamido]2-methyl-4-methoxybenzene | A dark green grey. |

Example 10

The Bz-1-tolylsulfonamido-6-aminobenzanthrone was used as a fast base with coupling components of the Napthol AS type. The following list shows the results obtained when diazotized Bz-1-tolylsulfonamido-6-aminobenzanthrone is brought into contact with cotton cloth padded with the following compounds:

| Compound | Result |
|---|---|
| 1-(2',3'-hydroxynaphthoylamido)-4-chlorobenzene | A blue red. |
| 1-(2',3'-hydroxynaphthoylamido)-2-methylbenzene | A blue red. |
| 1-(2',3'-hydroxynaphthoylamido)-2-methoxybenzene | A blue red. |
| 1-(2',3'-hydroxynaphthoylamido)-3-nitrobenzene | A blue red. |
| 1-(2',3'-hydroxynaphthoylamido)-naphthalene | A blue red. |
| 1-(2',3'-hydroxynaphthoylamido)-2-ethoxybenzene | A blue red. |

This application is a division of my co-pending application, Serial No. 449,267, filed August 11, 1954.

I claim:

1. The process for preparing a substantially pure 6-Bz-1-diaminobenzanthrone which comprises heating Bz-1-bromo-6-nitrobenzanthrone in an inert solvent with an arylsulfonamide in which the aryl group is a carbocyclic radical of less than three rings until the bromo group is substantially replaced by an arylsulfonamido group, reducing the resulting Bz-1-arylsulfonamido-6-nitrobenzanthrone to the corresponding 6-amino compound, and treating the resulting sulfonamido-amino-benzanthrone with a strong acid to obtain 6-Bz-1-diaminobenzanthrone.

2. The process of claim 1 in which the reduction is carried out by heating the nitro compound with an alkaline reducing agent selected from the group consisting of alkali sulfides and hydrosulfites.

3. The process of claim 1 in which the arylsulfonamide is a monocyclic arylsulfonamide.

4. The process of claim 3 in which the arylsulfonamide is toluenesulfonamide.

5. A process of claim 4 in which the Bz-1-toluenesulfonamido-6-nitrobenzanthrone is purified by dissolution into aqueous alkali and removal of impurities by filtration, and the purified material in the filtrate is reduced with sodium hydrosulfite.

6. Bz-1-arylsulfonamido-6-nitrobenzanthrones in which the aryl group is a carbocyclic radical of less than three rings.

7. Bz-1-tolylsulfonamido-6-nitrobenzanthrone.

References Cited in the file of this patent

UNITED STATES PATENTS 1,565,229  Kalischer et al. _____ Dec. 8, 1925

OTHER REFERENCES

Beilstein's Handbook, 4th edition, vol. 14, 2nd Suppl. 1951, pp. 76–77.